April 4, 1944.     L. W. BROOKS     2,345,790
BUCKET OR RECEPTACLE FOR LOADING, HAULING, AND DUMPING APPARATUS Original Filed April 10, 1940

INVENTOR.
Lew Wallace Brooks, Dec'd.
Ernest N. Brooks, Karl Martin,
John A. Ayres, Executors

BY

ATTORNEYS.

Patented Apr. 4, 1944

2,345,790

UNITED STATES PATENT OFFICE 2,345,790

BUCKET OR RECEPTACLE FOR LOADING, HAULING, AND DUMPING APPARATUS

Lew Wallace Brooks, deceased, late of Knoxville, Tenn., by Ernest N. Brooks, Karl Martin, and John A. Ayres, executors, all of Knoxville, Tenn., assignors to Brooks Equipment and Mfg. Co., Knoxville, Tenn., a corporation of Tennessee Original application April 10, 1940, Serial No. 328,955, now Patent No. 2,313,514, dated March 9, 1943. Divided and this application March 6, 1943, Serial No. 478,278

3 Claims. (Cl. 214—77)

The present invention relates to buckets or receptacles for loading, hauling and dumping equipment, and this application is a division of an application for United States patent on such equipment filed by Lew Wallace Brooks, April 10, 1940, Serial No. 328,955, now Patent No 2,313,514, granted March 9, 1943.

In said application is disclosed material handling equipment wherein a single vehicle provided with a hoist mechanism is adapted for economical loading at the rear portion of the vehicle and selectively dumping, or unloading without dumping, at the rear portion of the vehicle, buckets or receptacles of a nature suitable for the transportation and delivery of miscellaneous material.

The principal objects of the present invention are to provide buckets or receptacles for such material handling apparatus, which have large load capacity, consisted with strength and durability; which may be manufactured at a comparatively low cost; and, which embodies parts having dual functions, such as to reinforce the buckets or receptacles, and afford support for parts of mechanism provided to dump the buckets.

Another object of the invention is to provide buckets or receptacles which may be easily maintained in good repair and which use in their construction, standard rolled metal sections, bolts, etc., which are readily obtainable for repair and replacement.

A further object of the invention is to provide buckets so shaped that the center of gravity of the load is well to one side of the center of the mouth of the bucket, thereby enabling the bucket to be placed on the truck in a manner to bring the center of gravity of the load over the rear axle or more to a zone above and between the front and rear axle of the truck.

Another object of the invention is to shape the bucket or receptacle that it may be swung to and from the bed of the truck even though the latter is inclined, as when the truck is on a hill, allowing suitable clearance and avoiding relatively long booms as parts of the bucket handling unit.

Other objects and advantages of the invention will appear in the following detailed description of the preferred embodiment of the invention, taken in connection with the accompanying drawing, forming a part of this specification, and in which drawing.

Figure 1:
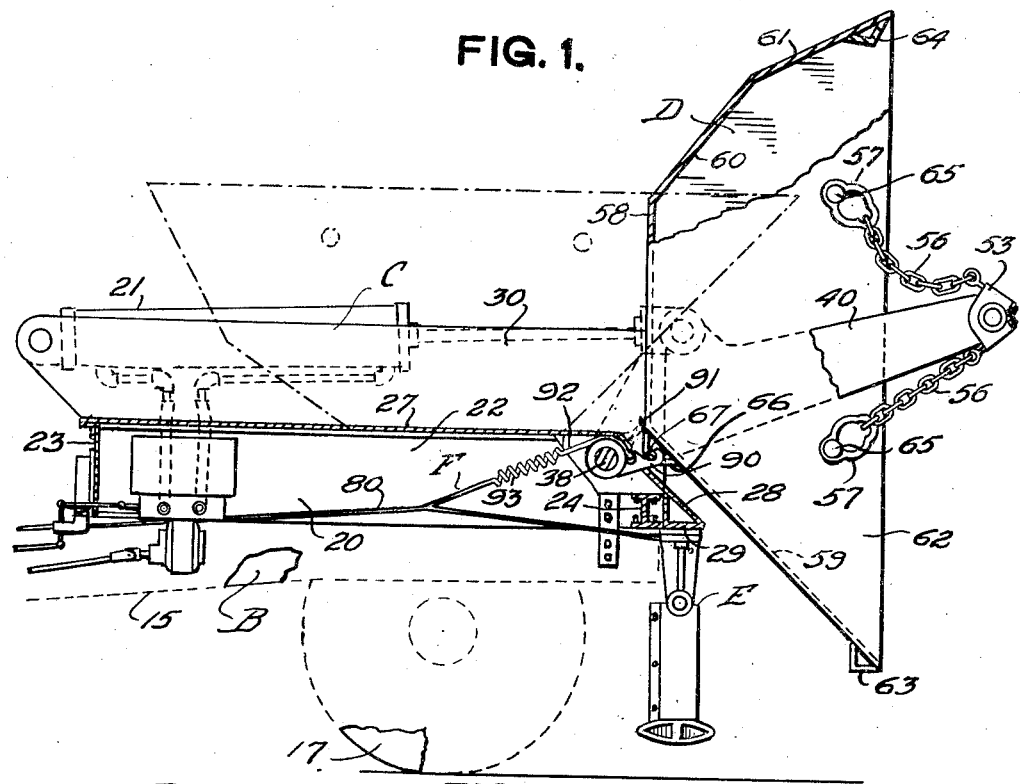
Figure 1 is a view partly in elevation and partly in section through loading, hauling and dumping apparatus, with a bucket, constructed according to the present invention, shown in full lines in a load dumping position, and in dot and dash lines, resting upon the truck bed.
Figure 2:
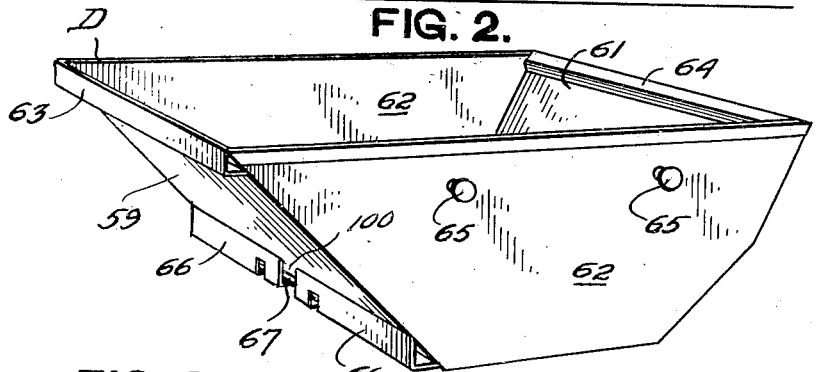
Figure 2 is a perspective view of the bucket or receptacle.

In the drawing, a suitable truck B is disclosed, supported a bucket or receptacle handling unit C, a bucket or receptacle D, constructed according to the present invention; a jack-like support E; and, means F for tipping the bucket or receptacle.

The truck B may be of any preferred type and in the example shown includes a chassis 15 including rear running gear 17.

The bucket handling unit C, is shown as including a sub-frame 20 upon which is mounted hydraulic hoist means 21 having detachable connection with the bucket D.

The sub-frame 20 is preferably of welded construction and includes a pair of longitudinal supports or bed rails 22 provided with suitable front cross bracing 23 and rear cross bracing 24. Supported upon and secured to the bed rails 22 is a horizontal deck plate or load supporting platform 27. The forward edge of the deck plate may be secured, as by welding, to the upper side of the front cross bracing 23. The rear end of the deck plate 27 has a sloping or inclined tilting portion 28 which extends downwardly over the rear cross bracing 24 and is preferably reinforced along its lower edge by an angle iron brace 29.

Secured, as by welding or in any preferred manner, to each side edge of the deck plate 27 is a side plate 30 which extends above the deck plate throughout its length, with the forward ends of the plates extending forwardly of the front edge of the deck plate. The rear end portions of these inner side plates 30 extend below the deck plate for attachment to the rear cross brace member 24 beyond the ends of the tilting portions 28.

The hoist means 21 is shown as including a boom 40 pivotally mounted on a shaft 38 and adapted to be swung to various positions to extend above the chassis 15 and to the rear of the chassis as may be understood from Figure 1. This boom is shown connected to the bucket D by means of a pivoted saddle 53 at the free end of the boom, chains 56, and key plates 57 detachably engaging headed lugs 65 on the bucket D.

Referring now to the bucket construction D, the same is made of heavy steel plate sections which are welded together and suitably reinforced to provide a substantially one-piece structure having a width slightly less than the spacing between the inner side walls 30 of the sub-frame and of not too great height to permit easy loading of the bucket. The bucket is substantially square in top plan and is formed with a flat bottom wall 58 having a long sloping or inclined rear wall 59 extending upwardly at an angle of about 45° from the rear edge of the bottom wall. The front wall of the bucket is formed with angularly related inclined flat wall portions 60 and 61 which are so disposed that the front wall extends in a more general vertical direction than does the flat rear wall 59. Vertical side walls 62 are welded to the ends of the wall portions 58, 59, 60 and 61. A reinforcing angle 63 is preferably placed along the top edge and at the outer side of the rear wall 59, while a reinforcing angle 64 is placed at the inner side along the upper edge of the front wall portion 61. As shown more clearly in Figure 1, the area of the flat bottom wall 58 is rather small in comparison with the top area of the bucket. The specific formation of the front and rear walls of the bucket will place the major weight of the load to the front of the bucket. Welded to the upper portion of each side wall 62 are the spaced apart lugs 65 which are adapted to detachably receive the key plates 57 whereby the bucket may be suspended by the saddle chains 56 for handling the bucket.

Provided along the outer side at the lower end of the inclined rear wall 59 are reinforcing angle irons 66 which are spaced apart at their adjacent inner ends and support a dumping bar or rod 67 in spaced relation to the bucket wall 59 midway between the side walls 62. This dumping bar 67 is adapted to cooperate with trip means on the sub-frame for tilting the bucket into a load dumping position.

Figure 3:
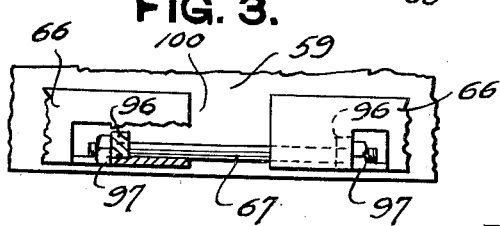
Figure 3 is a fragmentary detailed view of the bottom portion of the bucket, showing a dumping bar which cooperates with trip means on the bucket handling unit to tip the bucket for discharge of the contents thereof.

The dumping bar 67 has its end portions received in and extending thru spaced bearings 96, welded or otherwise secured to the angle irons 66, and are screw threaded to receive nuts 97 shown in Figure 3 whereby the dumping bar 67 may be detachably or replaceably carried by the angle irons 66.

Referring now to the trip means F for dumping the bucket, this means in the example shown includes a trip hook 90 mounted to turn freely on the load shaft 38 at a location midway of the ends of the shaft. This trip hook 90 projects upwardly thru a slot or opening 91 provided in the upper portion of the inclined tilting portion 28 at the rear of the deck plate 27 and is adapted to be engaged by the dumping bar 67 to tilt the bucket to a dumping position. A cable 92 is attached at one end of the trip hook 90 and has its opposite or forward end connected to a jack operating cable 80 at a point forwardly of the load shaft 38. A coil spring 93 is interposed in the cable 92 which allows the bucket in dumping to turn the trip hook 90 about the load shaft 38 without placing a strain on the cables 80 or 92. The trip hook 90 is limited in its forward swinging movement thru engagement with the deck plate at the forward edge of the opening 91; and is normally free to swing rearward and downward when engaged by the dumping bar 67. When so engaged, the corner edge of the angle irons 66 on the bucket engages the inclined deck portion 28 and forms a fulcrum point during dumping.

Referring now to the manner of dumping a loaded bucket from a carrying position on the truck, when the trip hook 90 is in an operative position, as shown in dotted lines in Figure 1, it may be readily engaged by the dumping bar 67. As the booms 40 swing rearward, the dumping bar 67 engages the trip hook 90 which causes the bucket to be tipped into the full line showing position in Figure 1, so that the contents of the bucket are discharged. The hoist means may then be operated for returning the bucket to a carrying position on the truck and the dumping bar will automatically disengage from the trip hook.

The angles 66 support most of the bucket and load during the dumping operations, first by transmitting stresses set up in the dumping rod by the dumping hook and then, at the time when most of the load may have been discharged, by the juncture line between the angle legs resting on the inclined portion 28 of the hoist bed. At the limit of travel, when the rear wall 59 is touching the inclined portion 28 the angle irons 66 supports the bucket in tension, thru its attachment to the wall 59.

The angle irons 66 are also useful in pushing the top of a pile of discharged material in order to lower the height of the pile and flatten its top, so more material can be dumped on top of the pile from a subsequent bucket load.

The space 100 between the angle irons 66 may be wide enough to expose sufficient of the dumping rod 67 for proper cooperation with the dumping hook 90, for the dumping operation, yet the space 100 may be narrow enough to limit sidewise travel of the bucket, by the one or the other of the ends of angle irons 66 engaging the hook 90, when the truck is standing on a considerable side slope during a dumping operation.

The objects and advantages of the inclined wall portions 60 and 61 is to dispose the center of gravity of the loaded bucket as far forward of the center of the plane of the top opening as can be and have all parts of the front face of the bucket clear the hoist bed, when being raised with the truck in level position or headed down hill on slopes ordinarily met with.

This shape also provides rigidity with a minimum of reinforcement against stresses set up by backing the truck against it, thereby preventing distortion of the bucket.

What is claimed is:

1. A bucket for loading, hauling and dumping apparatus including a flat bottom wall, a rear wall inclining upwardly and outwardly from said bottom wall, a pair of elongate reinforcing members secured to said rear wall adjacent and parallel to its juncture with said bottom wall, said reinforcing members being in end to end spaced relation adjacent the middle of the rear wall, and a dumping rod carried by said reinforcing members and traversing said space.

2. A bucket for loading, hauling and dumping apparatus including a flat bottom wall, a rear wall inclining upwardly and outwardly from said bottom wall, a pair of angle irons secured with the free edges of their legs to said rear wall adjacent and parallel to its juncture with said bottom wall, said angle irons being in end to end spaced relation adjacent the middle of the rear wall, bearings carried by the legs of said angle irons adjacent said space between the angle irons, and a dumping bar traversing said space and having its end portions supported by said bearings.

3. In a one-piece bucket for loading, hauling and dumping apparatus, the combination of a bottom wall, a rear wall inclining upwardly and outwardly from said bottom wall at substantially an angle of 45° to the plane of said bottom wall, a front wall including a flat lower wall portion and a flat upper wall portion in angular relation to each other and to said bottom wall, the lower portion inclining upwardly and outwardly from said bottom wall, with its inner face at an obtuse angle thereto, and the upper portion inclining upwardly and outwardly from said lower portion and with its inner face in a plane in obtuse angular relation to the plane of the inside face of said lower portion, whereby said front wall extends in a more general vertical direction from said bottom wall than does said rear wall, and side walls joining said front and rear walls.

ERNEST N. BROOKS,
KARL MARTIN,
JOHN A. AYRES,
*Executors of the Estate of Lew Wallace Brooks. Deceased.*